United States Patent [19]
Flanders

[11] 3,808,727
[45] May 7, 1974

[54] ADJUSTABLE SELF-REGULATING TROLLING DEVICE

[76] Inventor: Robert D. Flanders, Rt. 2, Box 666, No. 42, Wilsonville, Oreg. 97070

[22] Filed: Aug. 21, 1972

[21] Appl. No.: 282,588

[52] U.S. Cl. ............................................. 43/43.13
[51] Int. Cl............................................. A01k 95/00
[58] Field of Search ................................... 43/43.13

[56] References Cited
UNITED STATES PATENTS

| | | | |
|---|---|---|---|
| 2,062,718 | 12/1936 | Kallberg | 43/43.13 |
| 2,979,851 | 4/1961 | Telford | 43/43.13 |
| 2,891,345 | 6/1959 | Uhlen | 43/43.13 |
| 3,466,787 | 9/1968 | Collins | 43/43.13 |
| 2,741,863 | 4/1956 | Magill | 43/43.13 |
| 3,667,148 | 6/1972 | Dawson | 43/43.13 |

Primary Examiner—Antonio F. Guida
Assistant Examiner—Daniel J. Leach
Attorney, Agent, or Firm—Daniel P. Chernoff; Jacob E. Vilhauer, Jr.

[57] ABSTRACT

An adjustable self-regulating trolling device for maintaining a fishing lure or bait at a constant predetermined depth with respect to the surface of a body of water being fished. The device comprises a flat, laterally extending plate having a variable, multi-positional weight assembly attached to the front of the plate. A fin, having a tow line retainer bar attached at its upper end and a rudder-like lower portion, is pivotally mounted within the plate and is spring-biased for limited arcuate movement in a vertical path with respect to the plate. By setting certain structural adjustments incorporated within the design of the mechanism, which include a slideable stop in abutting communication with the retainer bar and interchangeable springs of varying tension interconnectable between the plate and any one of a number of slits formed on the fin, the desired proportional relationship between the angle and distance of descent of the device respectively can be achieved, and the depth to which the structure will dive before it reaches a constant planing position in the water can be predetermined. Additionally, the device is self-regulating and is therefore designed for automatic resetting to its predetermined constant planing position upon displacement therefrom.

11 Claims, 4 Drawing Figures

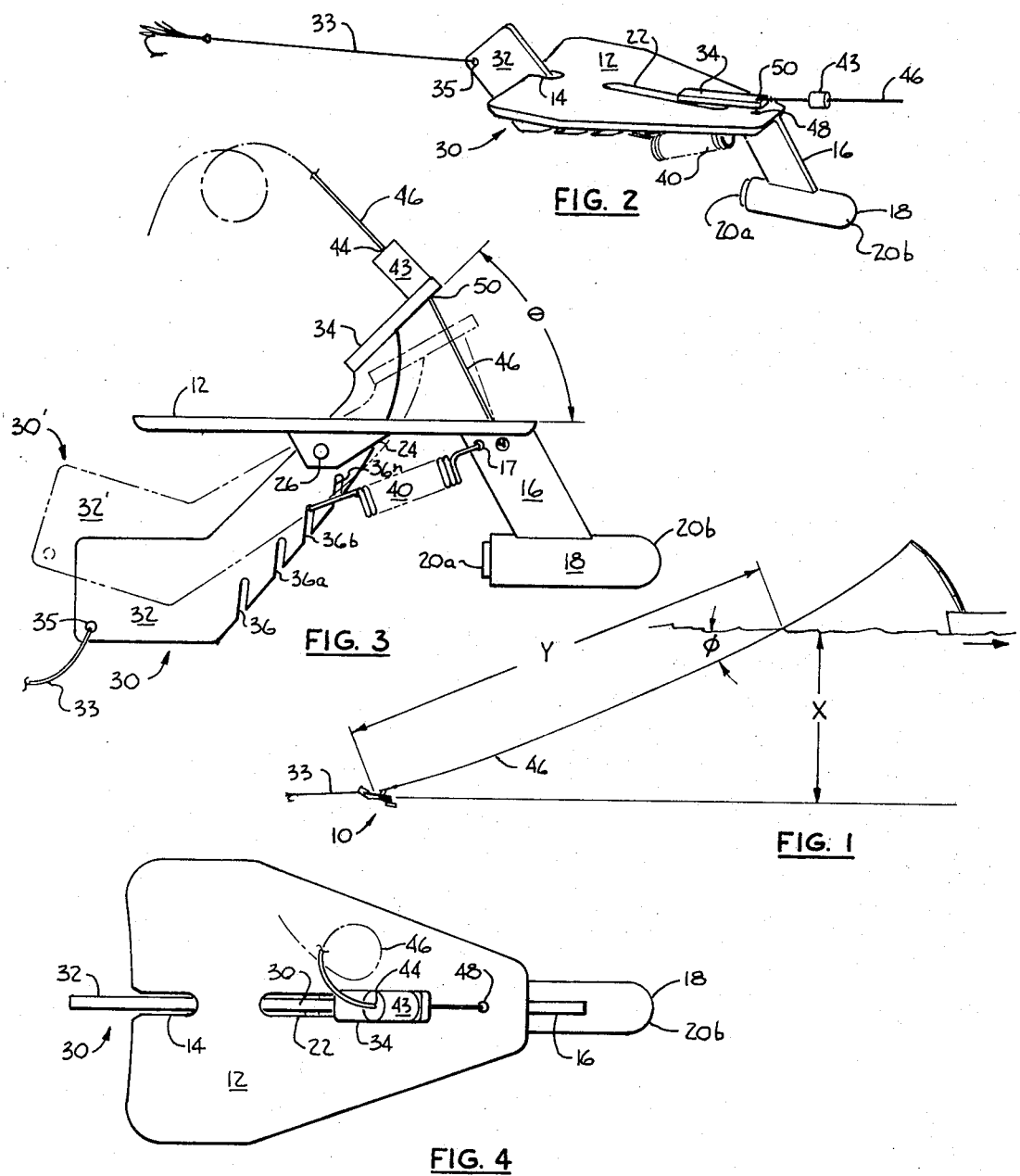

ADJUSTABLE SELF-REGULATING TROLLING DEVICE

BACKGROUND OF THE INVENTION

This invention relates to an adjustable self-regulating device which allows a fisherman automatically and consistently to troll at a desired predetermined water depth where fish are to be found. As experienced anglers know, fish are generally grouped or distributed in any body of water at certain temperature levels which best complement their life support systems. Accordingly, these more desirable temperature strata will produce larger fish concentrations. The location of these desirable temperature levels in any body of water will vary depending on the fish, the total depth of the particular body of water, the ambient temperature of the air, the amount of sunlight prevalent in the area, and the season of the year. Therefore, if a lure or bait can be effectively and consistently presented to fish located in these areas, for example by trolling, it follows that the fisherman's chance of catching his limit of large fish is greatly enhanced.

Various types of devices are used to aid in trolling at a constant depth below the surface of a body of water being fished. One device known to the prior art comprises a Y-shaped metal bail to which a laterally extending flat plate is connected. A swivel secured to the fishing line slideably engages a portion of the bail. When the device enters the water, it dives at a random attitude to a distance below the surface of the water determined, for the most part, by the buoyant forces exerted by the water in conjunction with the action of the boat pulling on the line. Finally, the apparatus reaches an equilibrium position and begins to plane through the water. Because of the dependency of this structure on conditions exterior to the device such as boat speed, water currents and the like, further complicated by the tendency of the structure to veer off in any direction due to its swivel connection to the line, effective control of a lure or bait at a predetermined depth remains a problem. Similarly, once the device is tripped and is displaced from its planing position, the swivel slides freely to a different position on the bail. In order to reset the device the line must be moved manually by the fisherman on the boat in an attempt to maneuver the swivel connection, which is located up to 50 feet below the surface of the water, back to its previous position on the bail. This presents a serious problem since the direction in which the line must be maneuvered in order to reset the device in a planing position is opposite to the movement of the boat. In addition, because of the movement of the swivel, the fisherman cannot cast his line into the water since the device may be tripped upon entering the water. Finally, there is no direct permanent connection between the angler's line, attached to the bail, and the lure or bait extending from the rear of the device, thereby minimizing the "feel" that a fisherman normally experiences when a fish strikes at the line or when the hooked fish is being reeled in.

United States Letters Patent No. 3,645,224 is directed to a trolling apparatus having a hollow shell which permits the structure to achieve a planing position in the water at the point where the pressure in the interior section of the shell equals the pressure exterior thereto. In a manner similar to the previously described prior art device, the diving, planing and reset positions of the assembly are varied by the movement of the fishing line along a curved support portion of the mechanism. Again, a problem exists since the planing depth of the device is controlled by forces exterior to the system, the device being essentially reliant on the equalization of pressure to stabilize the system in a planing position, while the reset problems associated with the free movement of the tow line along the curved surface of the device remain.

Accordingly, a real need exists for a trolling device which has adjustable features within its own self-structure for permitting the angler, prior to entry of the device into the water, to predetermine its attitude and distance traveled during diving, as well as its eventual movement in a straight horizontal path at a substantially constant depth behind the boat. In addition, it is desirable to provide a self-regulating trolling device designed to reset itself to a planing position at the desired depth automatically and quickly, upon being displaced from such position, as well as providing a permanent means of direct connection between the angler and the fish.

SUMMARY OF THE INVENTION

The present invention is directed to a novel and improved adjustable self-regulating depth control device for maintaining a fishing lure or bait towed by a boat at a predetermined depth with respect to the surface of the body of water being fished. The novel structure comprises a flat, laterally extending plate member weighted at one end, having a notch at the other end, and including a longitudinally extending slot disposed between the respective ends of the plate. A fin, pivotally connected within the slot, has a rudder-like lower portion, a tow line retainer bar at its upper end, and a plurality of slits extending along its longitudinal inside edge. A fishing lure or leader is secured within an aperture in the rudder and follows the trolling device through the water. A strut, depending angularly downward and forward from the plate member, supports a closed cylindrical chamber which holds various amounts of pelletized weighted material which act as ballast. By adding weight to either the front or rear portions of the cylindrical chamber, the center of gravity of the device can be changed. The fin is spring-biased for limited rotational movement in a vertical arcuate path with respect to the plane of the plate member by the action of one of a number of interchangeable springs which engages a selected one of the slits of the fin, exerting a variable predetermined yieldable spring tension force. The lower end of the fishing line is fastened to the front of the plate and passes through an aperture formed in the tow line retainer bar of the fin. A slideable stop carried by the fishing line abuts against the retainer bar and adjustably limits the spring-biased angular movement of the fin.

The depth, i.e. the perpendicular distance with respect to the surface of the water, to which the structure dives at a given boat speed before reaching a constant planing level, is predetermined by setting one or more of the unique adjustments incorporated within the structure of the device before it is cast into the water. These adjustments include the aforementioned variable ballast weight, the variable tension of the fin-biasing spring and the adjustable stop which limits the spring-biased movement of the fin. In addition, the apparatus is self-regulating so that it quickly and automatically resets itself to a planing position when tripped, i.e. when displaced from its proper attitude in the water, for example by encountering an obstruction, since once the adjustable parameters of the mechanism are fixed the depth at which the device will plane in the water is established. In contrast, a weighted structure has a tendency to dive until it hits bottom where it can hang up or become lost or, at best, become fouled or entrapped in the rocks or plant growth below. Because of the unique "spring-loaded" action of the invention, the device will react and be reset in the planing position even if it hits bottom. Moreover, because of the self-regulating feature of the device, the fisherman can cast his line into the water without being concerned with the device being tripped upon entry into the water.

The strut and attached weighted cylinder, in conjunction with the rudder, provide the device with unidirectional stability as the line is towed behind the boat. Also, by securing both the tow line and bait assembly at opposite ends of the fin, the angler can experience the feel of the fish striking and pulling on the line.

Accordingly, it is a principal objective of the present invention to provide a new and improved adjustable, self-regulating depth control device which maintains a fishing lure or bait at a constant predetermined depth during trolling, is quickly and automatically reset to the predetermined depth after being displaced from its designated planing position, and provides the angler with the ability to cast his line into the water and to feel the fish bite directly so that he can more effectively hook and play the fish.

It is a principal feature of the present invention to provide a plurality of adjustments within the structure of the device for varying and controlling the depth to which the device will dive, as well as a self-regulating mechanism for automatically correcting the attitude of the device in the water to maintain it at a predetermined depth.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a view of a trolling device according to the present invention being towed by a boat in a planing position through a body of water.

FIG. 2 is a perspective view of the trolling device.
FIG. 3 is a side view of the device of FIG. 2.
FIG. 4 is a plan view of the device of FIG. 2.

DETAILED DESCRIPTION OF THE INVENTION

Referring now to FIGS. 2–4 the trolling device, generally designated as 10, comprises a delta-shaped, flat, laterally extending plate member 12 having a notch 14 formed in its rear end. A strut 16, affixed to and depending angularly downward and forward from the front end of the plate, is provided with a cylindrical tube 18 attached longitudinally to its lower end.

The cylinder 18, which is preferably made of a clear rigid plastic material, has a removable plug 20a and a sealed end 20b which permits varying amounts of lead shot or other heavy pelletized material capable of weighting down the front end of the device to be retained within its confines. The amount of weight added to the cylinder determines the downward force available to overcome the buoyant forces exerted upwardly against the device 10. In addition, the position of the weight within the tube determines, within limits, the location of the center of gravity of the device. Therefore, to vary the location of the center of gravity, rubber or plastic foam may be inserted in the front or back portions of the tube to retain the weight in its desired position. For example, by placing more weight toward sealed end 20b the center of gravity will be shifted forward, increasing the mechanism's diving attitude.

Interposed between notch 14 and strut 16 in the plate 12 is a longitudinally extending slot 22 which includes a pair of identically spaced bosses 24 depending downward from the longitudinal edges of the slot. A fin 30 passes through slot 22 and is pivotally connected to the bosses by means of pin 26. The fin has a tow line retainer bar 34 affixed at its upper end and a rudder member 32 angularly disposed in a direction away from its lower end. A fishing lure or leader is secured within an opening 35 in the lower rear portion of the rudder 32 and follows the trolling device through the water. A plurality of spaced spring fastening slits 36–36n are formed within the forward longitudinal edge of the lower portion of the fin, i.e., below plate 12. Fin 30 is spring-biased for limited rotational movement in a vertical arcuate path with respect to the plane of plate 12 by the yieldable tension forces exerted on it by a spring 40 interconnected between an aperture 17 formed in the strut 16 and one of the selected slits 36–36n. The plate 12, strut 16 and fin 30 are all preferably constructed of an impact-resistant polymer or similar material.

A pair of apertures 48 and 50 are provided within plate 12 and retainer bar 34 respectively. A tow line 46 is fastened within aperture 48 and passes through aperture 50 where it is frictionally engaged within an opening 44 of a slideable stop 43. The remainder of the line passes upward where it acts as a tow line from the boat during trolling.

The spring-biased mechanism 10 provides a number of adjustments which can be used by the fisherman, in addition to the aforementioned adjustable ballast, to permit him to predetermine the final planing depth of the device. These adjustments which are made to the structure of the device itself, vary both the descent distance, i.e., the straight line distance from the boat to the device at the point when the device begins to plane at a constant depth, and the attitude angle, i.e., the instantaneous angle at which the mechanism is diving in the water, the latter adjustment producing a corresponding change in the overall angle of descent $\phi$ (FIG. 1) from the boat to the device.

One adjustment is made by moving the slideable stop 43 along line 46, which limits fin 30 to a pre-selected maximum attitude angle $\theta$ (FIG. 3) with respect to the laterally extending plate member 12, until such time as a force exerted on the retainer bar 34 by the line 46 begins gradually to counteract the force transmitted by the biasing spring 40. As illustrated in FIG. 1, the depth X at which the device planes is a function of the descent distance Y and the overall angle of descent $\phi$. By adjusting the maximum attitude angle $\theta$, the angle $\phi$ will be proportionately altered, which in turn varies the final planing depth achieved.

Moreover, the descent distance Y can also be changed by the aforementioned adjustment of stop 43.

As the force exerted by the spring 40 is gradually overcome, the rudder portion 32 moves toward the underside of plate 12 until, as shown in phantom in FIG. 3, the fin moves to a planing position 30' with rudder 32' located just below the underside of plate 12. Thus the descent distance Y is also proportional to the magnitude of the arcuate path traveled by the rudder from the time the device enters the water until the time it begins to plane so that the fisherman can pre-set the device to a desired descent distance before casting his line into the water.

Another structural adjustment is provided by positioning the free end of spring 40 in any one of the slits 36–36n. As the spring is attached to slits of increasing distance away from aperture 17, the tension force produced by the biased spring are proportionately increased. Therefore, by increasing the spring tension force, the fin will require more time to reach a given planing position which will proportionately increase the descent distance Y. An additional means for adjusting the descent distance is provided by interchanging any number of springs 40 having different spring tensions, one for the other, so that the amount of counteracting force necessary to move the fin to planing position is correspondingly varied.

In operation, the trolling device is attached to line 46 and lure or leader 33 respectively. The aforementioned requisite adjustments are made by the fisherman, including the adjustment of stop 43, the selection of a proper spring tension force and the loading of the desired ballast into tube 18 all made in accordance with the intended trolling speed of the boat and length of tow line. Thereafter the device is cast into the water and enters with its weighted front end inclined in a generally downward direction. Initially the fin 30 is at its maximum attitude angle $\theta$ determined by the adjustment of stop 43, but as the mechanism dives the increasing tension on the line 46 gradually overcomes the spring force until the predetermined trolling depth is reached, whereupon the device begins to plane with the front end of the plate 12 tilted slightly downward and the fin 30 held at the position shown in phantom in FIG. 3.

A further major feature of the device is its self-regulating design which allows the structure to stabilize at all times at a predetermined planing position. Accordingly, if the line 46 becomes slack the spring 40 will react to reestablish the device in a diving position until such time as the force of the line is great enough to overcome the force exerted by the spring. In this manner, the device automatically and quickly resets itself at all times without being withdrawn from the water. This principle applies generally to situations where the device is displaced from its planing position, such as by contacting obstructions or by a fish striking the line. When a fish is hooked for example, fin 30, due to the heavy line pull, is moved to the collapsed position shown in FIG. 2. The front end of the device is pulled upward by the line and the angler begins reeling in the line with only a minimum amount of water resistance being experienced. If the strike is only a momentary one the line 46 will go slack, and the spring 40 will automatically reset the device at a diving angle until the proper planing depth is again reached.

The trolling device of this invention has been carefully designed to attract all kinds of fish. Because of its configuration and color, the traditional function of flashers and other hardware designed to attract fish to the area of the bait or lure can be accomplished without the attendant heavy drag and the loss of feeling normally present when the flasher-type attachments are employed.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A submersible trolling device adaptable for attachment to a tow line which comprises:
   a. a laterally extending plate member having weight means for overcoming the buoyant forces exerted upon said device when in the water; and
   b. spring-biased self-regulating control means attached to said plate member for automatically causing said device to dive whenever the tension on said tow line is less than a predetermined tension.

2. A submersible trolling device adaptable for attachment to a tow line for maintaining a fishing bait assembly at a substantially constant depth during trolling which comprises:
   a. a laterally extending plate member having weight means for overcoming the buoyant forces exerted upon said device when in the water; and
   b. spring-biased control means pivotally attached to said plate member so as to rotate in a limited vertical arcuate path with respect to the plane of said plate member for regulating the trolling depth of said device, said control means including a spring-biased pivotal member having means for engaging said tow line, said member being limited in its spring-biased rotational movement by a stop member mounted on said tow line in abutting communication with said member.

3. The trolling device of claim 2, further characterized in that said stop member is moveable in either direction along said tow line.

4. The trolling device of claim 2 wherein said device includes means for permitting variation of the spring-biasing force imposed on said pivotal member.

5. The trolling device of claim 4 wherein said means for permitting variation of the spring-biasing force on said pivotal member includes a plurality of spaced spring-fastening slits formed on said member.

6. The trolling device of claim 4 wherein said means for permitting variation of the spring-biasing force on said pivotal member includes means for permitting replacement of a particular biasing spring with one having a different spring force.

7. The trolling device of claim 1, further characterized in that said weight means includes means for permitting adjustment of the amount of said weight and its position with respect to said plate member for varying the total weight and center of gravity location of said device respectively.

8. A submersible trolling device adaptable for attachment to a tow line for maintaining a fishing bait assembly at a substantially constant depth during trolling which comprises:

a. a laterally extending plate member having weight means for overcoming the buoyant forces exerted upon said device when in the water;

b. spring-biased control means pivotally attached to said plate member so as to rotate in a limited vertical arcuate path with respect to the plane of said plate member for regulating the trolling depth of said device, said control means including a pivotal fin having a retainer bar and rudder affixed to the upper and lower ends respectively of said fin, said retainer bar containing an aperture for engaging said tow line and said rudder containing an aperture engaged by said fishing bait assembly; and c. a strut depending downwardly from said plate member with a cylindrical tube attached thereto for retaining said weight means.

9. The device of claim 1 wherein said self-regulating control means comprises a spring-biased, movable means for engaging said tow line.

10. The device of claim 1 wherein said self-regulating control means further comprises means for automatically causing said device to rise whenever the tension on said tow line is greater than said predetermined tension.

11. A submersible trolling device adaptable for attachment to a tow line which comprises:

a. a laterally extending plate member having weight means for overcoming the buoyant forces exerted upon said device when in the water;

b. control means movably attached to said plate member for variably controlling the attitude of said device in the water; and c. means forcibly interacting between said movable control means and said plate member for automatically moving said control means relative to said plate member in a direction causing said device to assume a diving attitude whenever the tension on said tow line is less than a predetermined tension.

* * * * *